(12) United States Patent
Lee et al.

(10) Patent No.: US 7,639,677 B2
(45) Date of Patent: Dec. 29, 2009

(54) OPTICAL TRANSPONDER HAVING SWITCHING FUNCTION

(75) Inventors: Joon Ki Lee, Daejeon (KR); Jyung Chan Lee, Daejeon (KR); Kwangjoon Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 546 days.

(21) Appl. No.: 11/152,099

(22) Filed: Jun. 15, 2005

(65) Prior Publication Data

US 2006/0092988 A1 May 4, 2006

(30) Foreign Application Priority Data

Nov. 2, 2004   (KR) ............... 10-2004-0088179
Jan. 26, 2005  (KR) ............... 10-2005-0007248

(51) Int. Cl.
*H04J 3/02* (2006.01)
(52) U.S. Cl. ...................... 370/366; 370/538
(58) Field of Classification Search ........... 398/66–79, 398/98–102, 1–20; 714/2; 370/216–228, 370/366, 516–519
See application file for complete search history.

(56) References Cited

U.S. PATENT DOCUMENTS

| | | | |
|---|---|---|---|
| 6,308,062 B1 * | 10/2001 | Chien et al. | 455/420 |
| 6,332,198 B1 * | 12/2001 | Simons et al. | 714/6 |
| 6,430,201 B1 | 8/2002 | Azizoglu et al. | |
| 6,959,128 B2 * | 10/2005 | Castanon et al. | 385/16 |
| 7,092,642 B2 * | 8/2006 | Way | 398/193 |
| 7,110,668 B2 * | 9/2006 | Gerstel et al. | 398/5 |
| 7,286,487 B2 * | 10/2007 | Perkins et al. | 370/253 |
| 7,349,445 B2 * | 3/2008 | Hayashi | 370/516 |
| 2002/0145779 A1 * | 10/2002 | Strasser et al. | 359/124 |

FOREIGN PATENT DOCUMENTS

KR   10-2003-0084984   11/2003

OTHER PUBLICATIONS

Lee, et al.; "Implementation of a 10-ports multi-protocol interface transponder"; Photonics Conference 2004; Nov. 2004.

* cited by examiner

*Primary Examiner*—Kwang B Yao
*Assistant Examiner*—Alex Skripnikov
(74) *Attorney, Agent, or Firm*—Lowe Hauptman Ham & Berner, LLP

(57) ABSTRACT

Provided is an optical transponder that receives a tributary signal such as a SDH/SONET signal, a GbE (Gigibit Ethernet) signal, and a SAN (Storage Area Network) signal in a WDM (Wavelength Division Multiplexing) transmission system and a SDH (Synchronous Digital Hierarchy)/SONET (Synchronous Optical Network) system, and more particularly, to an optical transponder having a switching function. The optical transponder having a switching function includes: a switch changing a data path of an input tributary signal from a plurality of channels (ports); an STM-64/OC-192 mapper/demapper mapping the tributary signal switched to a different data path by the switch to an STM-64/OC-192 signal or demapping the STM-64/OC-192 signal to the tributary signal; and a transmission delay time compensator compensating for a differential delay caused by a transmission route difference on an optical fiber link when the STM-64/OC-192 signal is demapped to the tributary signal.

5 Claims, 5 Drawing Sheets

OPTICAL TRANSPONDER HAVING SWITCHING FUNCTION

This application claims the benefit of Korean Patent Application Nos. 10-2004-0088179, filed on Nov. 2, 2004 and 10-2005-0007248, filed on Jan. 26, 2005, in the Korean Intellectual Property Office, the disclosures of which are incorporated herein in its entirety by reference.

BACKGROUND OF THE INVENTION

1. Field of the Invention

The present invention relates to an optical transponder that receives a tributary signal such as an SDH/SONET signal, a GbE (Gigibit Ethernet) signal, and an SAN (Storage Area Network) signal in a WDM (Wavelength Division Multiplexing) transmission system and an SDH (Synchronous Digital Hierarchy)/SONET (Synchronous Optical Network) system, and more particularly, to an optical transponder having a switching function.

2. Description of the Related Art

An optical transponder interconnects a WDM transmission system and an SDH/SONET system with a client network. The optical transponder has been used to receive an SDH/SONET signal such as an STM-16/OC-48 signal, an STM-64/OC-192 signal, etc. Nowadays, the demand for a connection for various tributary signals such as a GbE signal, an FC (Fiber Channel) signal, an ESCON (Enterprise Systems CONnectivity) signal, etc., i.e., the demand for a multiprotocol signal processing, has increased due to an increase of data communication traffic.

As the transmission speed through an optical channel of the WDM transmission system has increased from 2.5 Gb/s to 10 Gb/s, four STM-16/OC-48 signals are multiplexed or a plurality of GbE signals are multiplexed as a 10 Gb/s OTN (OTU2) signal in order to effectively operate the optical channel of the WDM transmission system. To this end, an optical transponder is required.

A commercialized optical transponder receives up to eight channels of the GbE signal and multiplexes it as an OTU2 (Optical Channel Transport Unit for 10G) signal for transmission.

However, a conventional optical transponder does not have a switching function required for the GbE signal to change a transmission route of the signal with respect to each multiplexed channel (port). A signal that is input to an $n^{th}$ channel (port) must be output to the $n^{th}$ port at a remote side. Such a fixed operation causes inconvenience in that an operator has to change the transmission route personally when a network configuration needs a change in the transmission route. This operation takes a lot of time, thereby degrading the flexibility of network utilization.

SUMMARY OF THE INVENTION

The present invention provides an optical transponder having a switching function by supplementing a switch to change a transmission route of a tributary signal that is input to each channel (port) of the optical transponder, thereby automatically changing a network configuration.

The present invention also provides a module used for a WDM transmission system and a different transmission system by modularizing an optical transponder using a pluggable connector and initializing hardware using a firmware.

According to an aspect of the present invention, there is provided an optical transponder having a switching function, comprising: a switch changing a data path of an input tributary signal from a plurality of channels; an STM-64/OC-192 mapper/demapper mapping the tributary signal switched to a different data path by the switch to an STM-64/OC-192 signal or demapping the STM-64/OC-192 signal to the tributary signal; and a transmission delay time compensator compensating for a differential delay caused by a transmission route difference on an optical fiber link when the STM-64/OC-192 signal is demapped to the tributary signal.

According to another aspect of the present invention, there is provided an optical transponder, further comprising: a connector having a pluggable structure using an SFI-4 interface so as to be attached to and removed from an optical transponder line card, wherein the optical transponder is embodied as an independent module.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

Figure 1:
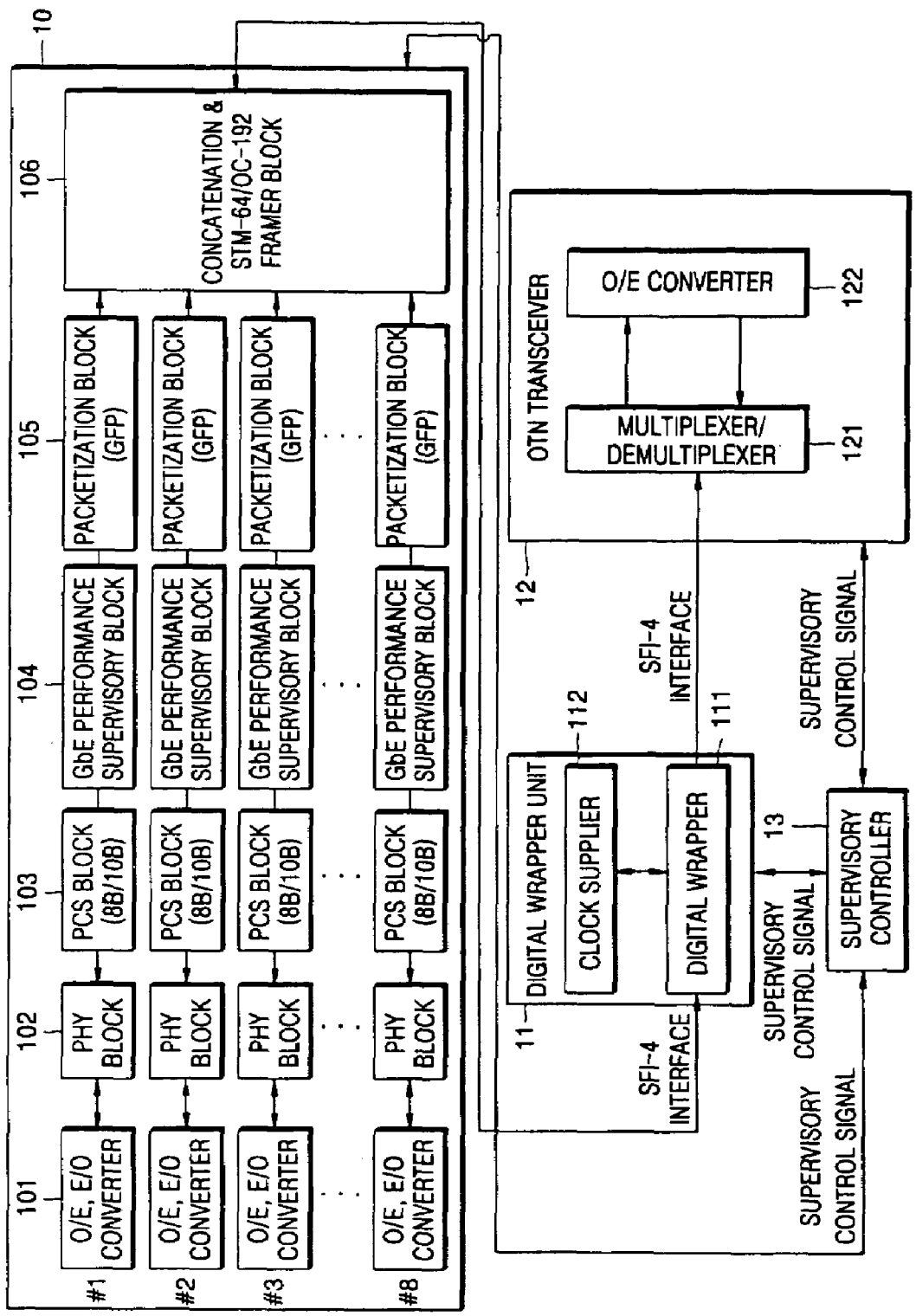
FIG. 1 is a block diagram illustrating a conventional optical transponder that multiplexes a GbE (Gigibit Ethernet) signal.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements.

FIG. 1 is a block diagram illustrating a conventional optical transponder that multiplexes a GbE (Gigibit Ethernet) signal. Referring to FIG. 1, the conventional optical transponder that has no switching function and receives a GbE optical signal comprises a GbE interface unit 10 for mapping the GbE optical signal to an STM-64/OC-192 signal or mapping the STM-64/OC-192 signal to the GbE optical signal, a digital wrapper unit 11 for mapping the STM-64/OC-192 signal to an OTU2 optical signal or demapping the OTU2 optical signal to the STM-64/OC-192 signal, an OTN transceiver 12 for interfacing the OTU2 optical signal, and a supervisory controller 13 for controlling functions mentioned above and supervising performance and information thereof.

The GbE interface unit 10 comprises an O/E E/O converter 101 for O/E or E/O converting the GbE optical signal, a PHY (OSI Physical Layer) block 102 for converting a GbE serial electric signal to a parallel electric signal or converting the parallel electric signal to the GbE serial electric signal, a PCS (Physical Coding Sublayer) block for performing an 8B/10B coding and an 8B/10B decoding, a GbE performance supervisory block 104 for monitoring a GbE frame and supervising an error thereof, a packetization block 105 for packetizing the GbE frame to have a predetermined size, and a concatenation & STM-64/OC-192 framer block 106 for mapping a packetized signal in a virtual container and making it as an STM- 64/OC-192 frame. The constituents 101 through 105 are prepared for each of channels #1 through #8.

The digital wrapper unit 11 comprises a digital wrapper 111 for mapping the STM-64/OC-192 signal to the OTU2 signal or demapping the OTU2 signal to the STM-64/OC-192 signal and a clock supplier 112 for supplying a clock necessary for the mapping and the demapping.

The OTN transceiver 12 comprises a multiplexer/demultiplexer 121 for receiving 16×669 MHz parallel data and a 669 MHz clock from the digital wrapper unit 11 and converting the parallel data into a 10.7 Gb/s serial electric signal and an O/E converter 122 for O/E converting the 10.7 Gb/s serial electric signal.

The OTN transceiver 12 is connected to sixteen parallel data, one clock signal, and supervisory control signals using a 300 pin MSA (Multi-Source Agreement) standard connector. Such a connection using the sixteen parallel data and the one clock signal is compliant to the SFI-4 (Serdes Framer Interface Level 4) connection standard defined by the OIF (Optical Internetworking Forum).

As described above, since the conventional optical transponder does not have a switching function to change a data route, it is inconvenient for an operator to change the data route personally when it is necessary to change a network configuration and it takes a lot of time to change the data route.

Figure 2:
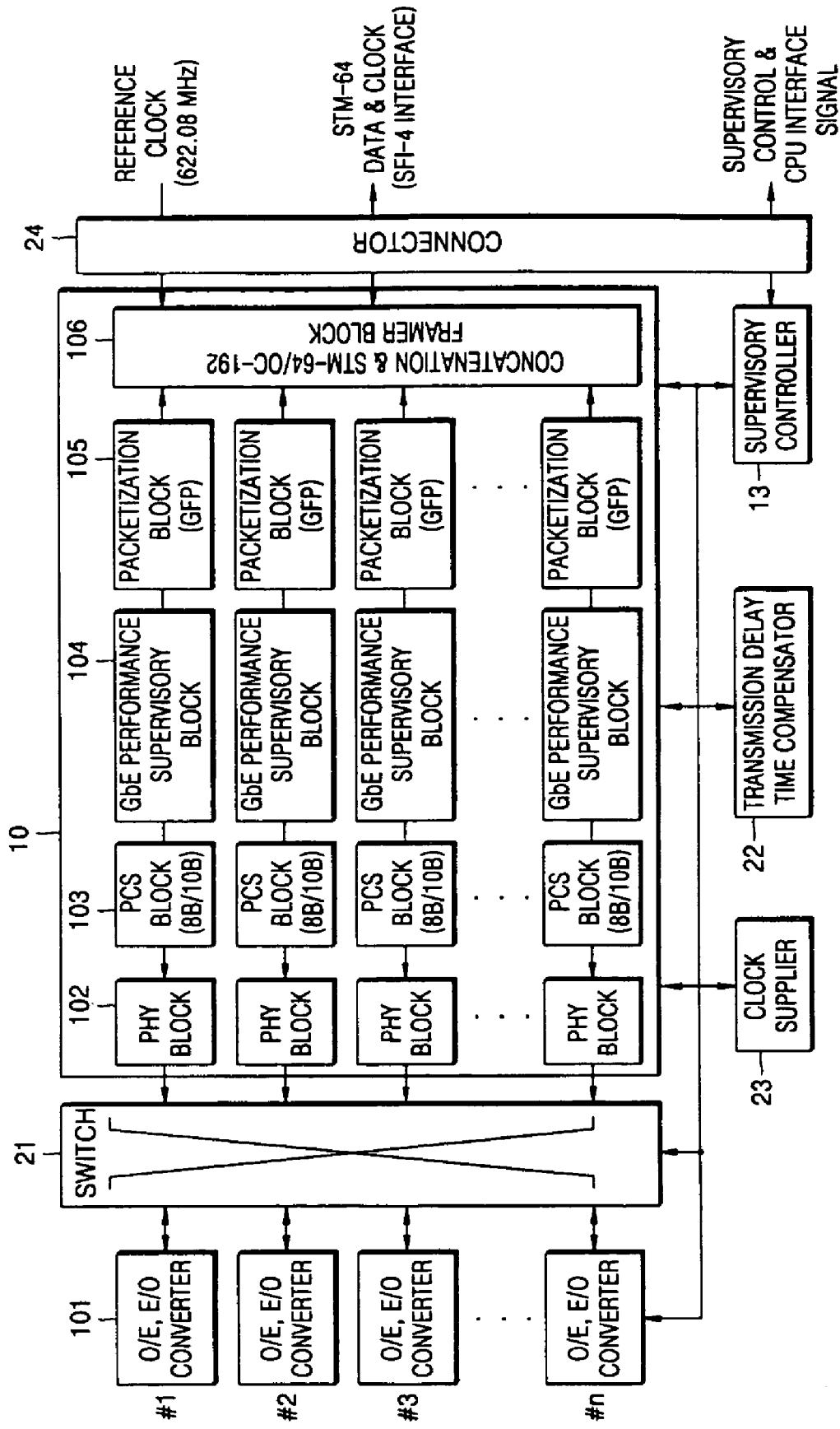
FIG. 2 is a block diagram illustrating an optical transponder according to an embodiment of the present invention.

FIG. 2 is a block diagram illustrating an optical transponder according to an embodiment of the present invention. Referring to FIG. 2, the optical transponder further comprises a switch 21 and a transmission delay time compensator 22 in addition to the constituents of the conventional optical transponder in order to resolve the problems mentioned above.

The O/E E/O converter 101 O/E or E/O converts a GbE signal with a speed of 1.25 Gb/s, a FC-1G signal with a speed of 1.0625 Gb/s, a FC-2G signal with a speed of 2.125 Gb/s, and an ESCON signal with a speed of 200 Mb/s and may use an SFP (Small Form-factor Pluggable) type transceiver.

The switch 21 exchanges (changes) a path of multiprotocol signal (tributary signal) data that input from each of ports #1 through #n by point-to-point or point-to-multipoint in an asynchronous manner. For example, the switch 21 changes the route of the data to output a multiprotocol signal such as a GbE signal and a SAN signal that is input from a first port #1 to a port other than the first port or several ports at a remote side.

The switch 21 performs a loop-back function. For example, the switch 21 enables to output an input multiprotocol signal from the first port to a second port #2 through an $n^{th}$ port #n or an input multiprotocol signal from the PHY block 102 of the first port at the remote side to the second port through the $n^{th}$ port #n.

A STM-64/OC-192 mapper/demapper 10 comprises a PHY (OSI Physical Layer) block 102 for converting a GbE or SAN serial electric signal to a parallel electric signal or converting the parallel electric signal to the GbE serial electric signal, a PCS (Physical Coding Sublayer) block for performing an 8B/10B coding and an 8B/10B decoding, a GbE performance supervisory block 104 for monitoring a GbE frame and supervising an error thereof when a transmitted signal is the GbE signal, a packetization block 105 for packetizing a frame of a multiprotocol signal to have a predetermined size, and a concatenation & STM-64/OC-192 framer block 106 for mapping a packetized signal in a virtual container and making it as a STM-64/OC-192 frame.

A clock supplier 23 supplies a standard clock for generating a variety of multiprotocol connection signals such as the GbE signal with a speed of 1.25 Gb/s, the FC-1G signal with a speed of 1.0625 Gb/s, the FC-2G signal with a speed of 2.125 Gb/s, and the ESCON signal with a speed of 200 Mb/s and supplies clocks for a generation of an STM-64/OC-192 signal and an SFI-4 interface.

The transmission delay time compensator 22 compensates for a differential delay caused by a transmission route difference on an optical fiber link when the STM-64/OC-192 mapper/demapper 10 demaps the STM-64/OC-192 signal to the multiprotocol signal (tributary signal).

The conventional optical transponder does not comprise the transmission delay time compensator 22 and thus transmits a plurality of tributary signals to a remote side using one optical link, whereas the optical transponder according to an embodiment of the present invention comprises the transmission delay time compensator 22 and thus transmits a plurality of tributary signals to a remote side using a plurality of different optical links.

The transmission delay time compensator 22 that may be embodied by a memory compensates for the differential delay by buffering an STM-64/OC-192 signal earlier arrived among STM-64/OC-192 signals that are transmitted via various optical links and cause the differential delay in the memory (RAM), reading the STM-64/OC-192 signal buffered in the memory at the time an STM-64/OC-192 signal transmitted late is arrived and recombining STM-64/OC-192 signals.

A supervisory controller 13 initializes and reconfigures each hardware and monitors condition and performance information of each hardware.

A connector 24 has a pluggable structure in order to be attached to and removed from a front plate of an optical transponder line card and transmits a standard clock of 622 Mb/s, parallel data of 622 Mb/s and clock (SFI-4 interface), power required in a module, and supervisory control signals and CPU interface signals to the outside.

Figure 3A:
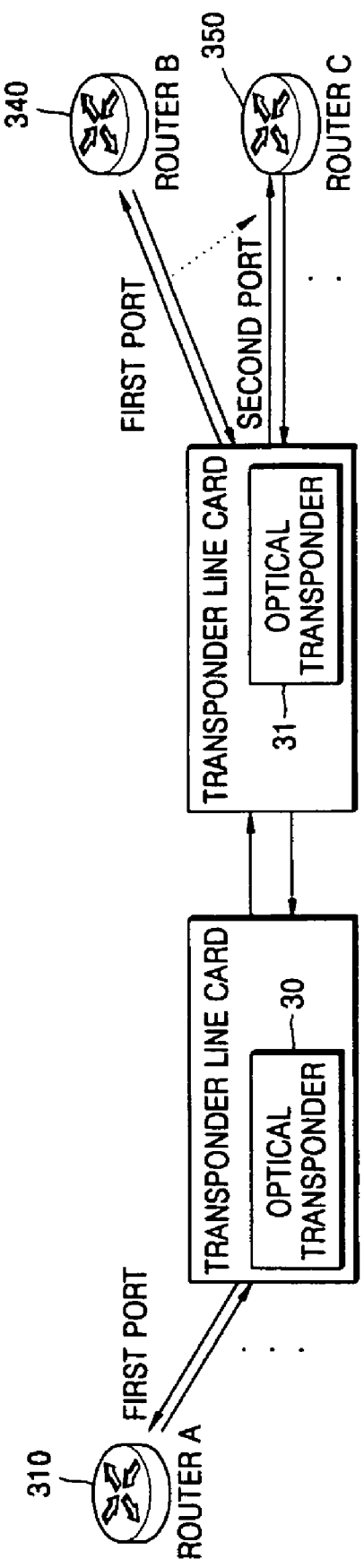
FIGS. 3A through 3C illustrate networks in which various functions of the optical transponder are performed according to an embodiment of the present invention.
Figure 3B:
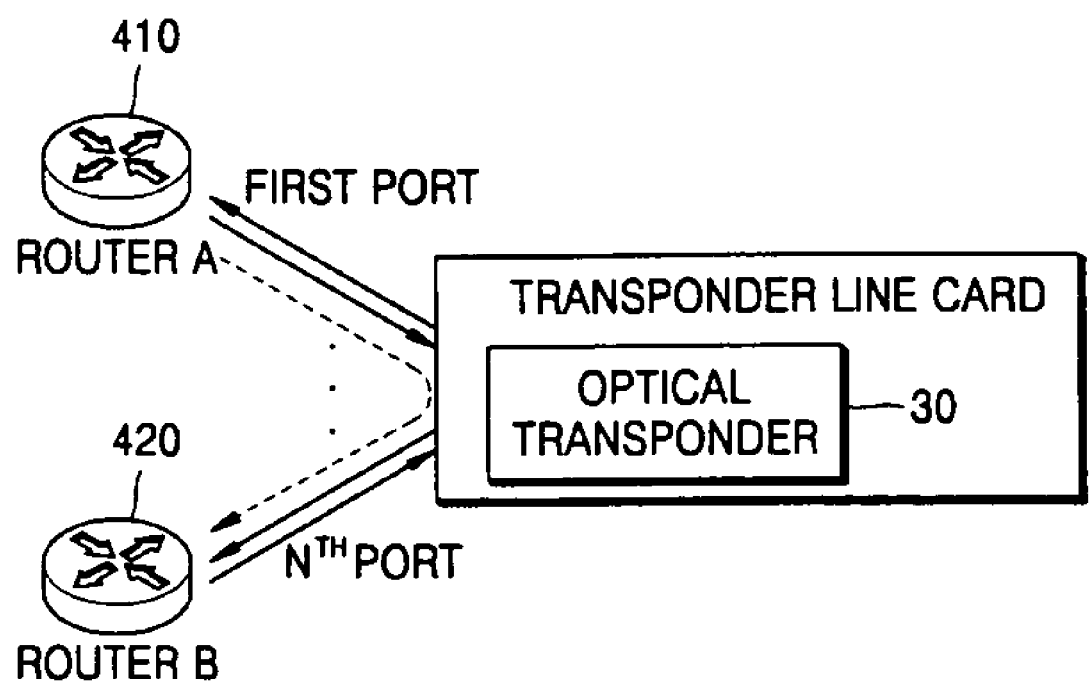
Figure 3C:
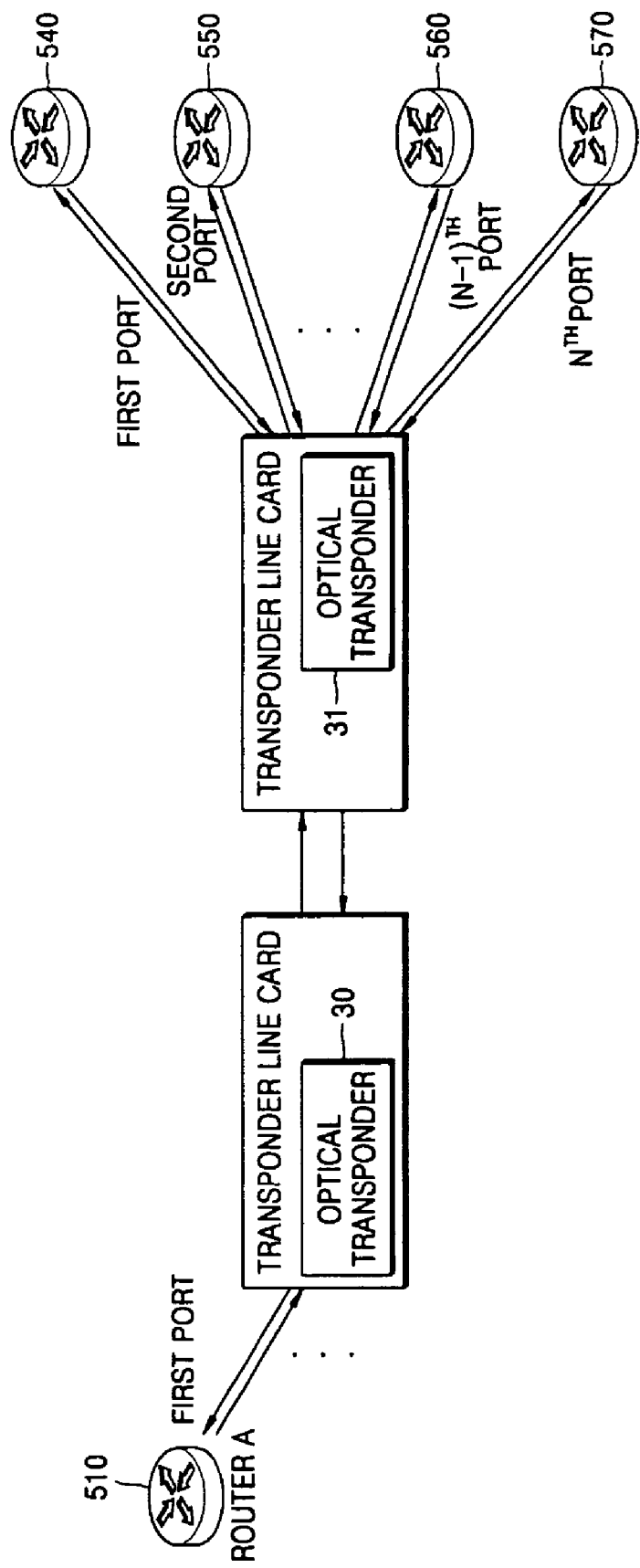

FIGS. 3A through 3C illustrate networks in which various functions of the optical transponder are performed according to the present invention. Referring to FIG. 3A, optical transponders 30 and 31 are attached to the optical transponder line card and output an input signal from a port of a transmitting side to a port of a remote side. When it is necessary to change a router A 310 connected to a router B 340 to be connected to a router C 350 due to a change in a network operation, a network is automatically reconfigured from A-B to A-C.

Referring to FIG. 3B, the optical transponder having the switching function interconnects a router A 410 with a router B 420 even though the router A 410 and the router B 420 are included in a different network, which is referred to as the loop-back function.

Referring to FIG. 3C, a predetermined protocol signal output from a router A 510 is broadcasted or multicasted to routers 540, 550, and 570 connected to the remote side.

According to the present invention, the optical transponder has a switch to change a route of a tributary signal that is input to each port (channel) using a broadcast or multicast exchange function, thereby increasing efficiency of a network operation and automatically changing a network configuration.

Since a pluggable connector is used to embody the optical transponder as an independent module, the optical transponder can be used in a WDM transmission system and an SDH/SONET system, thereby providing flexibility in a network utilization.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical transponder having a switching function, said optical transponder comprising:
   a plurality of optical-to-electrical (O/E) or electrical-to-optical (E/O) converters for O/E or E/O conversion of signals from or to a plurality of optical fiber links;
   a switch for changing a data path of an input tributary signal from a plurality of channels being transmitted over the plurality of optical fiber links;
   an STM-64/OC-192 mapper/demapper for mapping the tributary signal, which has been switched to a different data path by the switch, to an STM-64/OC-192 signal or for demapping the STM-64/OC-192 signal to the tributary signal; and
   a transmission delay time compensator for compensating for a differential delay caused by transmitting a plurality of said STM-64/OC-192 signals over various links among the plurality of optical fiber links when each said STM-64/OC-192 signal is demapped to a corresponding tributary signal;
   wherein said transmission delay time compensator is arranged for (i) buffering an earlier-arrived STM-64/OC-192 signal among the STM-64/OC-192 signals that are transmitted via the various optical links, (ii) reading the buffered, earlier-arrived STM-64/OC-192 signal upon arrival of a later-arrived STM-64/OC-192 signal among the STM-64/OC-192 signals, and (iii) recombining the later-arrived STM-64/OC-192 signal with the buffered, earlier-arrived STM-64/OC-192 signal to thereby compensate for said differential delay; and
   wherein said switch is coupled between the converters and the STM-64/OC-192 mapper/demapper, to be downstream of said converters and upstream of said STM-64/OC-192 mapper/demapper.

2. The optical transponder of claim 1, wherein the switch is arranged for:
   changing the route on a point-to-point or point-to-multipoint basis to output a tributary signal that inputs from a channel among the plurality of channels to the same channel or a different channel at a remote side, and/or
   changing the route to output the tributary signal that inputs from a channel to a different channel among the plurality of channels at the same side as said channel.

3. The optical transponder of claim 1, further comprising:
   a connector having a pluggable structure using an SFI-4 interface so as to be attachable to and removable from an optical transponder line card,
   wherein the optical transponder is embodied as an independent module.

4. The optical transponder of claim 1, wherein the switch is arranged for changing the route in a point-to-multipoint manner to output the tributary signal, which is inputted from a channel among the plurality of channels on an input side, to multiple channels at a remote side.

5. The optical transponder of claim 1, wherein the switch is arranged for changing the route by performing a loop-back function to output the tributary signal, which is inputted from a channel among the plurality of channels on an input side, to a different channel among the plurality of channels on said input side.

* * * * *